United States Patent [19]

Dawes et al.

[11] Patent Number: 4,485,062

[45] Date of Patent: Nov. 27, 1984

[54] PROCESS FOR EXTRUDING POLYMERS

[75] Inventors: James W. Dawes, Orange; Donald J. Ryan, Beaumont, both of Tex.

[73] Assignee: E. I. Du Pont de Nemours and Company, Wilmington, Del.

[21] Appl. No.: 510,811

[22] Filed: Jul. 5, 1983

[51] Int. Cl.³ .............................................. B29F 3/06
[52] U.S. Cl. ................................ 264/171; 264/176 F; 264/201; 425/97; 425/107
[58] Field of Search ................... 264/169, 171, 176 F, 264/201; 425/97, 107

[56] References Cited

U.S. PATENT DOCUMENTS

| | | | |
|---|---|---|---|
| 2,597,553 | 5/1952 | Weber | 18/12 |
| 2,936,482 | 5/1960 | Kilian | 18/8 |
| 3,054,142 | 9/1982 | Hinderer et al. | 264/169 |
| 3,095,608 | 6/1963 | Munsell | 264/169 |
| 3,458,615 | 7/1969 | Bragaw et al. | 264/171 |
| 3,669,722 | 6/1972 | Bishop | 117/100 |
| 3,832,116 | 8/1974 | Delorme | 425/381.2 |
| 3,920,782 | 11/1975 | Cogswell | 264/209.7 |
| 3,980,744 | 9/1976 | Cogswell | 264/515 |
| 4,080,138 | 3/1978 | Hutchinson et al. | 425/378 R |
| 4,165,556 | 8/1979 | Nishida et al. | 264/171 |
| 4,248,824 | 2/1981 | Hattop | 264/171 |
| 4,348,346 | 9/1982 | Thompson | 264/171 |
| 4,364,882 | 12/1982 | Doucet | 264/171 |
| 4,370,114 | 1/1983 | Okamoto et al. | 264/171 |
| 4,388,261 | 1/1983 | Codispoti et al. | 264/171 |

FOREIGN PATENT DOCUMENTS

| | | | |
|---|---|---|---|
| 694382 | 9/1964 | Canada | 425/97 |
| 2271917 | 1/1976 | France | 425/97 |
| 43-522 | 1/1968 | Japan | 264/169 |
| 44-2492 | 2/1969 | Japan | 264/169 |
| 65190 | 12/1975 | Japan | |
| 51-79168 | 7/1976 | Japan | 264/169 |
| 931476 | 5/1982 | U.S.S.R. | 264/300 |

*Primary Examiner*—Jeffery Thurlow

[57] ABSTRACT

Making polymeric extrudates having a smooth surface by feeding a molten polymeric core material through a die cavity wherein a portion of the wall of the die cavity is a rigid microporous structure located upstream from a narrowed flow passage of the die cavity, the microporous structure having a substantially uniform pore size, simultaneously forcing under pressure through the microporous structure about 0.03–10%, based on the total weight of the extrudate, of a low viscosity liquid to form a sheath on the molten polymeric core material thus displacing the polymeric core material before the resulting sheath-core composite enters the narrowed flow passage of the die cavity said process conducted under conditions to produce a pressure drop across the microporous structure of at least 0.10 MPa more than the pressure applied on the polymeric core material.

20 Claims, 2 Drawing Figures

PROCESS FOR EXTRUDING POLYMERS

BACKGROUND OF THE INVENTION

This invention relates to a process for extruding high viscosity polymeric materials. More specifically, it provides a process for making polymeric extrusions from high viscosity polymeric materials without generating surface roughness on the extrudate, and it permits extruding at higher rates and lower temperatures and reduced energy consumption.

Many polymeric materials are shaped into useful films, rods, tubes or are coated onto wire by extruding them through an orifice of relatively small dimensions. In such extrusion processes, the difficulties in obtaining a smooth extrudate increase as the viscosity of the polymeric material or output increases. The pressure required to force the material through the exit orifice also increases and an unstable flow phenomenon, often called melt fracture, occurs which results in a rough surface on the extrudate. Such rough surfaces can have adverse effects on extruded products, such as polyolefin rubbers, when, for example, the extrudate with a rough surface is pelletized under water. The interstices on the rough surface retain water and this makes drying the polymer difficult or impractical.

It is known that extrusion pressure can be reduced by forming the shaped die from a porous metal material and forcing a gaseous fluid through the pores. However, lubrication with a gas does not provide laminar flow or a smooth surface on the extrudate. It is also known to previously coat shaped extruded materials with various liquids using channels made of porous metal. Such methods have been typically utilized to lubricate the final shaping operation in manufacturing pipe or rods wherein the material is pulled through the die, rather than flowing through by upstream pressure. A method for reducing melt fracture of certain polymeric materials is known in which a small portion of the extruded material is separately heated to a higher temperature than the main mass (to reduce its viscosity) and then is applied as a surface layer in the forming die. This method is difficult to control, limited in viscosity difference, and is not as widely applicable as that of the present invention.

SUMMARY OF THE INVENTION

The present invention provides a process for making polymeric extrudates having a smooth surface which comprises feeding a molten polymeric core material, having a bulk viscosity of about $3 \times 10^3 - 10^6$ Pa.s at processing temperatures of about 100°-250° C., under positive pressure through a die cavity wherein a portion of the wall of the die cavity is a rigid microporous structure, preferably metal, located upstream from a narrowed flow passage of the die cavity, said microporous structure having a substantially uniform pore size, simultaneously forcing under pressure through the microporous structure about 0.03-10%, based on the total weight of the extrudate, of a low viscosity liquid having a bulk viscosity of about $10^{-1} - 10^3$ Pa.s at processing temperatures of about 100°-250° C. to form a sheath on the molten polymeric core material and substantially coat its surface and thus displacing the polymeric core material from contact with the die wall before the resulting sheath-core composite enters the narrowed flow passages of the die cavity, said process conducted under such conditions as to produce a pressure drop across the microporous structure of at least 0.10 MPa, usually within a range of about 0.2-12.0 MPa, more than the pressure applied on the polymeric core material, and the sheath-core composite flows through the narrowed flow passage of the die cavity and the die orifice.

DETAILED DESCRIPTION OF THE INVENTION

Figure 1:
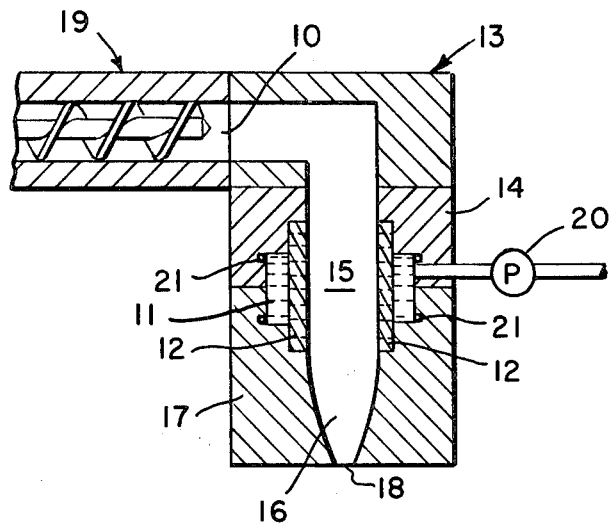
FIG. 1 represents a cross sectional view of a single hole extrusion die assembly for use with the present invention in which a microporous cylinder, which forms part of the wall of the die cavity, is held between two metal die plates upstream from a narrowed flow passage in the die cavity. The space between the die plates is closed at its periphery and serves as a reservoir for the low viscosity liquid which is forced through the microporous wall of the cylinder.

The process of this invention can be best described by referring to the drawings. As shown, especially in FIG. 1, an assembly for conducting the process comprises a die assembly 13 comprising a top die plate 14, a microporous structure 12 in the form of a metal cylinder and a bottom die plate 17. The die plates have suitable seals 21 to contain the low viscosity liquid under pressure. The die assembly has an entrance port 10 and die plates that form die cavity 15 which serves as a flow passage for the molten polymeric core material being extruded. The die cavity has a narrowed flow passage 16 at its exit end. The narrowing of the flow passage of the die cavity begins at a point below the microporous structure 12 so that the molten polymeric core material is displaced from contact with the die wall by the low viscosity liquid that is forced through microporous structure 12 thereby forming a low viscosity boundry layer on the molten polymer before the resulting sheath-core composite passes through narrowed flow passage 16 of the die cavity. It is important that microporous structure 12 is located upstream from narrowed flow passage 16 since the boundary layer, or sheath, of low viscosity liquid reduces the effective viscosity before shear rate is increased. Maximum benefit is thereby obtained with a reduction in die pressures, reduced power input and the elimination of melt fracture.

The high viscosity polymeric material enters the die cavity through entrance port 10, under positive pressure, usually from about 0.1-20 MPa, supplied from any conventional means such as a plastics screw extruder 19, flows through the top die plate 14 in die cavity 15 and into the open end of the microporous cylinder 12. A low viscosity material that is liquid at processing temperatures is forced through passage 11 and through the walls of microporous structure 12 under pressure, usually from about 0.2-12 MPa.s, provided by a gear pump 20 or a conventional high pressure pump. The conditions used in the process require that one obtain a pressure drop across the microporous structure of at least 0.1 MPa, usually 0.2-12 MPa.s, more than the pressure applied on the polymeric core material. The difference between the pressure on the high viscosity molten polymeric material and the pressure on the lower viscosity liquid is a differential value identified as pressure drop. The lower viscosity liquid displaces the molten polymeric core material from the wall of the microporous structure, preferably a metal cylinder, due to its higher pressure, and continues to flow in an outer concentric cylinder as the molten polymeric core material and low viscosity liquid form a sheath-core composite and pass through the die cavity in the bottom die plate 17. After the low viscosity liquid forms a sheath around the polymeric core material, the resulting sheath-core composite flows through narrowed flow passage 16 of the die cavity and exits from die orifice 18. Surprisingly, a very uniform distribution of a small amount of low viscosity liquid on the molten polymeric core material can be achieved when conditions are adjusted for the required pressure drop across the microporous structure. The extrudate will have a smooth surface. Concurrently, the pressure required for forcing the molten polymeric core material through the die assembly is markedly reduced to as low as about one-fourth that required without application of the low viscosity liquid on the surface of the molten polymeric core material.

The microporous structure 12 of the extrusion die assembly is readily supplied by the insertion of a microporous structure between two metal die plates 14 and 17, as shown in the drawing. The die plates 14 and 17 are separated by the microporous structure 12. The space between the plates serves as a passageway and reservoir for the low viscosity liquid entering passage 11. The microporous structure 12 can be made of metal or ceramic material. Usually, and preferably, the microporous structure is made of metal and fabricated by molding metal powders of such metals as stainless steel, nickel or monel alloy. Metal microporous cylinders are commercially available in a variety of sizes and porosities. The most useful of these for the present invention are 15 to 35 mm long, have wall thickness of 0.7-7 mm and have a substantially uniform pore size (diameter) in the range of about 0.2-150 $\mu$m, usually about 0.5-90 $\mu$m. Such microporous cylinders are manufactured primarily for use as filter elements. The choice of a particular pore size of the microporous structure and the surface area of the cylinder exposed for penetration by the low viscosity liquid is influenced by the viscosity of the low viscosity liquid used in the process and is necessarily smaller as the viscosity decreases so that the required pressure drop across the microporous structure can be achieved without excessive liquid flow.

Figure 2:
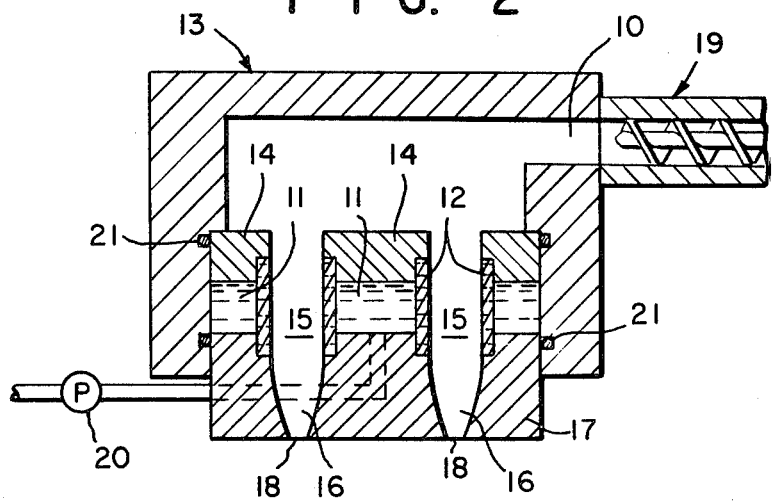
FIG. 2 is a cross sectional view of a multiple hole die assembly.

While the die cavity need include only one microporous structure, it is frequently most useful in commercial operations to include a multiplicity of microporous structures and die cavities in a single die assembly, all fed by one pump for each of the two liquids, i.e., the molten polymeric core material and the lower viscosity liquid, that are used in the process of this invention, as illustrated in FIG. 2.

The polymeric core material to be extruded can be supplied to the die assembly by a helical screw pump, i.e. extruder, which has a source of heat to help raise the temperature of the polymeric core material so that it is molten or liquefied and, also, to lower its viscosity. Other heating/pumping devices such as heated pressurized reservoirs (cylinders) or gear pumps can be used to pump the molten polymer.

The process of this invention is applicable to the extrusion of molten polymeric core materials having bulk viscosity of from about $3 \times 10^3$–10 Pa.s, usually $10^4$–$10^6$ Pa.s at processing temperatures of about 100°–250° C. Prior to this invention, these polymeric materials often could be extruded only at restricted rates with high pressures and with high power consumption frequently exhibited the unstable flow phenomenon known as melt-fracture which leaves the extrudate with a rough surface. Processing temperatures for extruding the polymeric materials are well known to those skilled in the art and such temperatures are usually between about 100° C.–250° C. depending on the thermal stability and melting point of the polymers used. Polymeric materials that can be used in this process include polyolefin plastics e.g., polyethylene, polypropylene and their copolymers with high olefins e.g., those having 3-12 carbon atoms; poly(vinyl chloride) and copolymers thereof with vinylidene chloride, vinyl acetate and the like; uncured elastomers, such as the polyolefin elastomers, e.g. EPM and EPDM rubber; chlorinated polyethylene, (CM) and chlorosulfonated polyethylene (CSM) rubber, ethylene/vinyl acetate copolymers, ethylene/alkyl acrylate copolymers; acrylonitrile-butadiene copolymers; styrene-butadiene copolymers; natural rubber; fluoroelastomers, i.e. copolymers derived from units of vinylidene fluoride and hexafluoropropylene optionally containing tetrafluoroethylene, polychloroprene and polyester plastics such as polyethylene terephthalate and polybutylene terephthalate and polyester elastomers such as copolyetheresters derived from an aromatic acid, a poly(alkylene oxide) glycol, and an aliphatic alcohol. The polymeric materials used in the extrusion process can, and usually do, contain various conventional additives and insert fillers such as carbon black, silica gel, alumina and/or stabilizers, flame retardants, cross-linking agents, curing agents, blowing agents, etc. The high viscosity values of the polymeric material is often the result of the concentration of additives or inert fillers, for example, solids such as carbon black, especially in elastomeric compounds. The process is especially useful in the extrusion of temperature sensitive elastomers, since it permits operation at increased rates and low temperatures due to the lowered power input required. The process also eliminates a type of melt fracture termed die peel or die drool which can cause imperfections on the surface of the elastomeric extrudate. The process is also especially useful for the extrusion of temperature sensitive thermoplastics, such as poly(vinyl chloride) and its copolymers, e.g. with vinylidene chloride or vinyl acetate. The process of this invention permits extrusion of very high viscosity polymers at commercially feasible rates at reduced energy consumption.

The low viscosity liquid that forms the sheath on the resulting composite must always have a lower viscosity than the molten polymeric core material. The low viscosity sheath material can be supplied to the exterior wall of the microporous structure by a variable speed gear pump or a helical screw pump. The pump used for the low viscosity liquid must be capable of developing a fluid pressure at least 0.10 MPa greater than the pressure on the molten polymeric core material in the die cavity. A pressure drop of about 0.10 MPa–20 MPa across the wall of the microporous structure is generally obtained, preferably 0.2-12 MPa. The maximum pressure can be higher, but it is limited by the strength of the walls of the microporous structure.

Any low viscosity liquid material having a bulk viscosity of about, $10^{-1}$–$10^3$ Pa.s, usually 1-600 Pa.s, at processing temperatures of about 100°–250° C. can be used in the present invention. The low viscosity liquid does not become mixed with the polymeric core material under processing conditions. The viscosity of this liquid is low enough so that it can be pumped and will flow through the wall of the microporous structure in an amount of about 0.03–10%, preferably 1–5%, based on the total weight of the extrudate, to form a sheath on the molten polymeric material. The low viscosity liquid substantially coats the surface of the polymeric core material and thus displaces the polymeric core material from contact with the die wall, and this occurs before the polymeric sheath-core material enters the narrowed flow passage of the die cavity. Generally, the sheath formed by the low viscosity material is about 0.3–170 microns thick and in most cases only about 0.4–30 microns thick for small diameter extrusions. The low viscosity liquid should also be chemically stable at processing temperatures so that toxic fumes and smoking are avoided. Among the most useful materials are petroleum oils, mineral oils, hydrocarbon waxes, Chlorowaxes, silicone oils, glycerol, fatty acids, fatty acid metal salts, fatty acid esters, fatty acid amides, fatty alcohols, water soluble polymers neat and in solution, polymeric glycols, carboxy vinyl polymers, polymeric surfactants and polyolefins e.g. polyethylene, polypropylene or ethylene/propylene copolymers or terpolymers. The low viscosity liquid need not be a single material. It can be a mixture of two or more materials chosen to obtain the optimum viscosity and flow rate for the particular pore size of the microporous structure used or to impart particular surface properties to the extruded polymeric core material. For example, the viscosity of a low molecular weight liquid can be lowered further by mixing it with petroleum or mineral oils or waxes, i.e. 17.5% EPDM in paraffin wax, or 80% polyethylene/20% wax.

The choice of the low viscosity liquid is also dependent upon the desired effects on the properties of the extruded polymeric core material. For example, the present process has been found quite useful in providing a smooth thin coating of a crystalline polymer, such as polyethylene, on the surface of an amorphous or elastomeric core material, such as EPM or EPDM or chlorosulfonated polyethylene rubber to help prevent massing, i.e. sticking together, of the extruded strands or pellets made by chopping the strands. The low viscosity material forming the sheath can be removed from the extrudate or it can remain as a coating on the extrudate.

The sheath can be removed by a variety of ways, for example, if the sheath is a water-soluble material, such as polyvinyl alcohol, it can be washed off. The sheath may remain on the extrudate, especially if the low viscosity material is substantially the same material as the high viscosity core material.

The successful operation of this process depends importantly on the pressure applied to the low viscosity liquid so that the required minimum pressure drop across the microporous structure is at least about 0.10 MPa, and a lower viscosity material is forced through the microporous structure to form a sheath on the polymeric material before the resulting liquid sheath-core composite enters the narrowed flow passage in the die cavity. The process permits a significant reduction of the die pressure on the extruding polymeric core material and one obtains a smooth polymeric extrudate at a higher rate of extrusion.

The following examples illustrate preferred embodiments of the invention. All amounts are by weight unless otherwise indicated.

EXAMPLE I

An EPDM rubber having an ethylene content (73 wt %) and a bulk viscosity of $10^5$ Pa.s at 190° C. (ML4 at 120° C.=60) was melted and pumped by a 38 mm extruder at 200° C. to a four hole extrusion die of the type shown in FIG. 2, wherein the porous metal cylinders had a nominal pore size of 0.5 μm an exposed length between the top and bottom plates of 0.75 mm and located upstream from the narrowed flow passage of the die cavity. Various low viscosity liquids, as shown in Table I, were pumped into the space between the upper and lower die plates at the pressures indicated. The data in the table show that the presence of the low viscosity liquid reduced the extrusion pressure needed to force the EPDM rubber through the die and that when the pressure drop, or difference, between the low viscosity liquid and the core polymer being extruded was at least 0.26 Pa.s the extrudate had a smooth surface with no evidence of melt fracture.

This example also illustrates that smooth pellets made from smooth extrudates could be much more easily dried than pellets with rough surfaces when both were immersed in water during pelletization. The smooth pellets were quickly air dried during vacuum conveying, while the rough pellets could be dried only with prolonged treatment with hot air.

TABLE I

| HIGH VISCOSITY POLYMER | | | | LOW VISCOSITY LIQUID | | | | PRES- | |
|---|---|---|---|---|---|---|---|---|---|
| TYPE | RATE[1] g/m/h | PRES- SURE MPa | TEMP. °C. | TYPE | VISCOSITY Pa s | CONC.[2] wt % of EXTR. | PRES- SURE MPa | RATE[1] g/m/h | SURE DROP MPa | EXTRUDATE SURFACE |
| EPDM | 50 | 8.18 | 200 | NONE | FOR COMPARISON | | | | | VERY ROUGH |
| EPDM | 73 | 4.92 | 200 | SILICONE OIL | 1 | 0.02 | 5.0 | 0.015 | 0.08 | ROUGH |
| EPDM | 89 | 4.64 | 200 | SILICONE OIL | 12.5 | 0.03 | 4.9 | 0.027 | 0.26 | SMOOTH |
| EPDM | 85 | 6.38 | 200 | SILICONE OIL | 30 | 0.15 | 8.4 | 0.13 | 2.02 | SMOOTH |
| EPDM | 88 | 8.26 | 200 | 83% PAR- AFFIN WAX + 17% EPDM RUBBER | 2.5 | 0.35 | 12.45 | 0.31 | 4.19 | SMOOTH |

[1]g/m/h = GRAM PER MINUTE PER DIE HOLE OPENING
[2]CONC. = CONCENTRATION

EXAMPLE II

An EPDM rubber having an ethylene content (75 wt %) and a bulk viscosity of ($5 \times 10^4$) Pa.s at 190° C. was melted and pumped by a 38 mm extruder at 200° C. to a six-hole die of the type shown in FIG. 2 wherein the porous metal cylinders, located upstream from the narrowed flow passage of the die cavity, had a nominal pore size of 40 μm for the first two cases shown in Table II and 90 μm for the last case. The exposed length between the top and bottom plates was 12.5 mm.

Low viscosity polyethylene or polypropylene was melted and pumped into the space between the upper and lower die plates at the pressure indicated. The extruded strands were smooth and were completely coated with polyethylene or polypropylene in the amount shown in Table II.

Silicone oil was pumped into the space between the die plates at the pressure indicated. The marked reduction in extrusion pressure and the improved extrudate surface are shown in Table III.

TABLE III

| HIGH VISCOSITY POLYMER | | | | LOW VISCOSITY LIQUID | | | | PRES- | |
|---|---|---|---|---|---|---|---|---|---|
| TYPE | RATE[1] g/m/h | PRES-SURE MPa | TEMP. °C. | TYPE | VISCOSITY Pa s | CONC.[2] wt % of EXTR. | PRES-SURE MPa | RATE[1] g/m/h | SURE DROP MPa | EXTRUDATE SURFACE |
| POLY-ETHYLENE | 23 | 14.8 | 185 | NONE | FOR COMPARISON | | | | | ROUGH |
| POLY-ETHYLENE | 22 | 7.6 | 185 | SILICONE OIL | 12.5 | 6.8 | 11.7 | 1.5 | 4.1 | SMOOTH |
| CSM RUBBER | 44 | 18.1 | 140 | NONE | FOR COMPARISON | | | | | VERY ROUGH |
| CSM RUBBER | 45 | 7.9 | 140 | SILICONE OIL | 12.5 | 3.5 | 12.7 | 1.6 | 4.8 | SMOOTH |

[1]g/m/h = GRAM PER MINUTE PER DIE HOLE OPENING
[2]CONC. = CONCENTRATION

EXAMPLE IV

A fluoroelastomer compound containing fillers and curing agents derived from units of vinylidene fluoride (60%) and hexafluoropropylene (40 %) having a bulk viscosity of $5 \times 10^4$ Pa.s at 121° C. was melted and pumped by a 38 mm extruder to a four hole die of the type shown in FIG. 2 wherein the porous metal cylin-

TABLE II

| HIGH VISCOSITY POLYMER | | | | LOW VISCOSITY LIQUID | | | | PRES- | |
|---|---|---|---|---|---|---|---|---|---|
| TYPE | RATE[1] g/m/h | PRES-SURE MPa | TEMP. °C. | TYPE | VISCOSITY Pa s | CONC.[2] wt % of EXTR. | PRES-SURE MPa | RATE[1] g/m/h | SURE DROP MPa | EXTRUDATE SURFACE |
| EPDM | 33 | 5.6 | 200 | NONE | FOR COMPARISON | | | | | VERY ROUGH |
| EPDM | 40 | 5.5 | 200 | POLY-ETHYLENE | 450 | 2.7 | 18.8 | 1.1 | 13.3 | SMOOTH |
| EPDM | 53 | 2.2 | 200 | POLYPRO-PYLENE | 600 | 1.9 | 10 | 1.0 | 7.8 | SMOOTH |

[1]g/m/h = GRAM PER MINUTE PER DIE HOLE OPENING
[2]CONC. = CONCENTRATION

EXAMPLE III

High density polyethylene having a bulk viscosity of $6 \times 10^3$ Pa.s at 190° C. and chlorosulfonated polyethylene rubber having a bulk viscosity of $1 \times 10^4$ Pa.s at 121° C. were melted and pumped by a 18.75 mm extruder to a one hole die of the type shown in FIG. 1 wherein the porous metal cylinder, located upstream from the narrowed flow passage of the die cavity, had a nominal pore size of 40 μm and the exposed length between plates was 12.5 mm.

der, located upstream from the narrowed flow passage of the die cavity, had a nominal pore size of 10 μm and the exposed length between plates was 1.27 mm.

A polyethylene (49%), paraffin wax (49%) yellow dye (2%), PE/Wax Blend, having a bulk viscosity of $10^3$ Pa.s was pumped into the space between the die plates at the pressure indicated. The marked reduction in extrusion pressure and the improved extrudate surface are shown in Table IV. No evidence of die peel was seen during this experiment.

TABLE IV

| HIGH VISCOSITY POLYMER | | | | LOW VISCOSITY LIQUID | | | | PRES- | |
|---|---|---|---|---|---|---|---|---|---|
| TYPE | RATE[1] g/m/h | PRES-SURE MPa | TEMP. °C. | TYPE | VISCOSITY Pa s | CONC.[2] wt % of EXTR. | PRES-SURE MPa | RATE[1] g/m/h | SURE DROP MPa | EXTRUDATE SURFACE |
| Fluoro elastomer[3] | 45 | 12.4 | 140 | NONE | FOR COMPARISON | | | | | MELT FRACTURE, DIE PEEL PRESENT |
| Fluoro elastomer[3] | 112 | 8.3 | 130 | PE/WAX | $10^3$ | 3.8 | 13.3 | 4.3 | 5.0 | SMOOTH STRANDS, NO EVI-DENCE OF |

TABLE IV-continued

| HIGH VISCOSITY POLYMER | | | | LOW VISCOSITY LIQUID | | | | | |
| --- | --- | --- | --- | --- | --- | --- | --- | --- | --- |
| TYPE | RATE[1] g/m/h | PRES- SURE MPa | TEMP. °C. | TYPE | VISCOSITY Pa s | CONC.[2] wt % of EXTR. | PRES- SURE MPa | RATE[1] g/m/h | PRES- SURE DROP MPa | EXTRUDATE SURFACE |
| | | | | | | | | | | DIE PEEL |

[1]g/m/h = GRAM PER MINUTE PER DIE HOLE OPENING
[2]CONC. = CONCENTRATION
[3]VINYLIDENE FLUORIDE (60%) HEXAFLUOROPROPYLENE (40%)

We claim:

1. A process for making polymeric extrudates having a smooth surface which comprises feeding a molten polymeric core material, having a bulk viscosity of about $3 \times 10^3 - 10^6$ Pa.s at processing temperatures of about 100°–250° C., under positive pressure through a die cavity wherein a portion of the wall of the die cavity is a rigid microporous structure located upstream from a narrowed flow passage of the die cavity said microporous structure having a substantially uniform pore size, simultaneously forcing under pressure through the microporous structure about 0.03–10%, based on the total weight of the extrudate, of a low viscosity liquid having a bulk viscosity of about $10^{-1} - 10^3$ Pa.s at processing temperatures of about 100°–250° C. to form a sheath on the molten polymeric core material that substantially coats its surface thus displacing the polymeric core material from contact with the die wall before the resulting sheath-core composite enters the narrowed flow passage of the die cavity, said process conducted under such conditions as to produce a pressure drop across the microporous structure of about 0.25–20 MPa more than the pressure applied on the polymeric core material and the sheath-core composite flows through the narrowed flow passage of the die cavity and the die orifice.

2. A process of claim 1 wherein the molten polymeric core material is an uncured elastomer.

3. A process of claim 2 wherein the uncured elastomer is an ethylene, propylene, nonconjugated diene copolymer.

4. A process of claim 2 wherein the uncured elastomer is chlorosulfonated polyethylene.

5. A process of claim 2 wherein the uncured elastomer is a fluoroelastomer.

6. A process of claim 5 wherein the fluoroelastomer contains units derived from vinylidene fluoride and hexafluoropropylene optionally containing tetrafluoroethylene.

7. A process of claim 2 wherein the uncured elastomer is chlorinated polyethylene.

8. A process of claim 1 wherein the molten polymeric core material is polyethylene.

9. A process of claim 1 wherein the molten polymeric core material is natural rubber.

10. A process of claim 1 wherein the molten polymeric core material is a styrene-butadiene copolymer.

11. A process of claim 1 wherein the molten polymeric core material is an acrylonitrile-butadiene copolymer.

12. A process of claim 2 wherein the molten polymeric core material is poly(vinyl chloride).

13. A process of claim 1 wherein the molten polymeric core material contains an inert filler.

14. A process of claim 1 wherein the low viscosity liquid is petroleum oil.

15. A process of claim 1 wherein the low viscosity liquid is a hydrocarbon wax.

16. A process of claim 1 wherein the low viscosity liquid is silicone oil.

17. A process of claim 1 wherein the low viscosity liquid is a polyolefin.

18. A process of claim 17 wherein the polyolefin is polyethylene.

19. A process of claim 17 wherein the polyolefin is polypropylene.

20. A process of claim 1 wherein the low viscosity liquid is glycerol.

* * * * *